Oct. 13, 1970    R. FREUND    3,533,248

ROCKING-HINGE COUPLING FOR MISALIGNED SHAFTS

Filed Dec. 18, 1968    2 Sheets-Sheet 1

United States Patent Office 3,533,248
Patented Oct. 13, 1970

3,533,248
ROCKING-HINGE COUPLING FOR MISALIGNED SHAFTS
Richard Freund, 273 Lawton Ave., Cliffside Park, N.J. 07010
Filed Dec. 18, 1968, Ser. No. 784,559
Int. Cl. F16d 3/30
U.S. Cl. 64—17
11 Claims

ABSTRACT OF THE DISCLOSURE

A rocking-hinge coupling comprises at least one free-floating disc-like member, for example a simple circular disc, having two angularly spaced pairs of diametrically opposed hinge elements, for example in the form of four equally spaced radially inwardly extending slots. The coupling further comprises a pair of actuating arms for individual attachment to the shafts to be coupled, each of the arms having a pair of hinge elements, for example in the form of axially extending lugs, engaging two diametrically opposed slots in one of the disc-like members. In one embodiment, each disc-like member is relatively rigid and the width of each slot is of the order of twice the thickness of the lugs of the actuating arms. In an alternate embodiment of the invention, portions of the disc-like members on either side of the slots are resilient and the width of each slot is approximately equal to the thickness of the lugs. For shaft misalignments less than 45°, only a single disc-like member is required. For shaft misalignments up to 90°, the coupling includes two such members and an interconnecting vane member having hinge elements engaging two diametrically opposed hinge elements of each of the disc-like members.

BACKGROUND OF THE INVENTION

This invention relates to a rocking-hinge shaft coupling and particularly to such couplings capable of accommodating a wide range of shaft misalignments, including 90°, while maintaining a substantially constant ratio approaching unity between the angular velocities of the driving and driven shafts throughout each revolution. The invention is particularly applicable to low-torque driving mechanisms, permitting all elements of the coupling to be fabricated from stamped sheet-metal parts.

The most common mechanism for coupling two misaligned shafts is the so-called universal joint, which comprises a spider having connections to the driving and driven shafts, usually by way of journal bearings. While such a coupling is quite satisfactory from an operating standpoint when shaft misalignment does not exceed 45°, it is a relatively complex and costly mechanism, requiring lubrication and maintenance which, for many applications, are undesirable, particularly if the coupling is to be used in a relatively inaccessible location.

Another well known form of coupling for misaligned shafts is the geared coupling which has appeared in a variety of forms.

It is an object of the present invention, therefore, to provide a new and improved shaft coupling which obviates one or more of the above-mentioned disadvantages of the prior universal joint.

It is another object of the invention to provide a new and improved shaft coupling which is extremely simple and of low-cost construction.

It is a further object of the invention to provide a new and improved shaft coupling which eliminates all rotatable bearings requiring lubrication.

It is a still further object of the invention to provide a new and improved shaft coupling in which all element interconnections are in the form of rocking or rolling hinges.

SUMMARY OF THE INVENTION

In accordance with the invention, there is provided a rocking-hinge coupling for two misaligned shafts comprising at least one free-floating disc-like member having two angularly spaced pairs of diametrically opposed hinge elements and a pair of thin axially extending actuating vanes for individual attachment to the shafts to be coupled, each of such vanes having a pair of hinge elements engaging two diametrically opposed hinge elements of one of the pairs of hinge elements of one of the disc-like members. The term "disc-like member" is used herein and in the appended claims to include either an integral or a composite member having the characteristics of a disc so far as material to the present invention.

For a better understanding of the present invention, together with other and further objects thereof, reference is had to the following description, taken in connection with the accompanying drawings, while its scope will be pointed out in the appended claims.

BRIEF DESCRIPTION OF THE DRAWINGS

FIGS. 6A and 6B are views in elevation and cross-section, respectively, of a further modified form of disc-like member; while

DESCRIPTION OF THE PREFERRED EMBODIMENTS OF THE INVENTION

Figure 1:
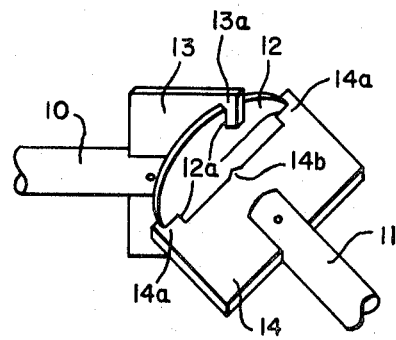
FIG. 1 is a perspective view of a shaft coupling embodying the invention suitable for use with shaft misalignments of less than 45°.

Referring now to FIG. 1 of the drawings, there is represented a rocking-hinge coupling for a drive shaft 10 and a driven shaft 11 misaligned by approximately 45°. This coupling includes a free-floating disc-like member such as a simple circular disc 12 having two angularly spaced pairs of diametrically opposed hinge elements in the form of four equally spaced radially inwardly projecting slots 12a. The coupling also comprises a pair of thin axially extending actuating arms or vanes 13 and 14 individually attached to the drive shaft 10 and the driven shaft 11, respectively, in any suitable manner. Each of the arms 13, 14, shown as a plate-like element, has a pair of hinge elements in the form of axially extending lugs, such as the lugs 13a and 14a, respectively. The lugs of each arm engage diametrically opposed hinge elements or slots of the disc 12. The dimensions of the lugs 13a, 14a and the slots 12a are somewhat exaggerated for the sake of clarity. It is contemplated that the elements 12, 13, and 14 will be ordinary sheet-metal stampings and the width of each of the slots 12a will be of the order of twice the thickness of the lugs 13a, 14a. Each of the actuating arms 13, 14 is provided with an axial pivot point, for example the pivot point 14b, which aids installation and in fixing the necessary operating clearance between the arms 13 and 14.

Figure 4:
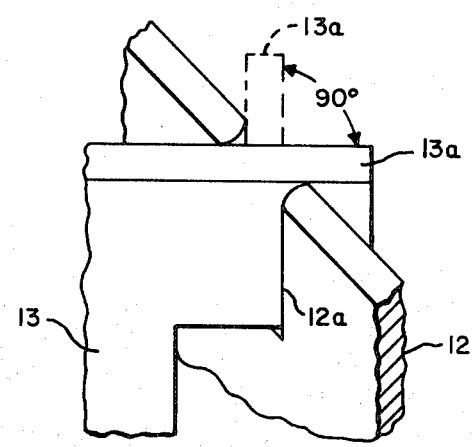
FIG. 4 is a fragmentary detail view of the engagement of one of the hinge elements of FIGS. 1 and 2 for extreme angular positions of the disc-like member.

In the operation of the coupling element of FIG. 1, during rotation of the drive shaft 10, the disc 12 is free-floating, being retained in position only by the engagement of the slots 12a with the lugs 13a, 14a of the members 13 and 14. During rotation of the shaft, the disc 12 executes a rocking or gyratory motion, resulting in a variation in the ratio of angular velocities of the drive shaft 10 and the driven shaft 11 during each revolution. The disc 12 gyrates through an angle equal to the angular misalignment of the shafts 10 and 11. This relationship is shown in FIG. 4 in which the position of the disc 12 relative to one of the lugs, for example the lug 13a, is shown in enlarged detail. One extreme position of the disc 12 is shown in solid line and a portion thereof in the other extreme position in dotted line. As shown in FIG. 4, the width of the slot 12a is approximately twice the thickness of the lug 13a. There is an advantage in rounding the edges of the slots 12a as shown in FIG. 4 and as explained hereinafter.

Figure 2:
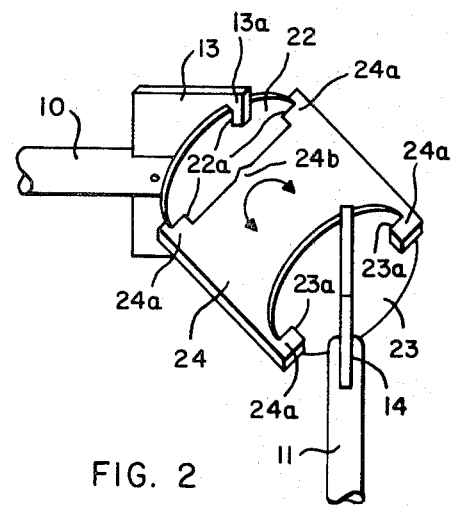
FIG. 2 is a perspective view of a coupling embodying an alternate form of the invention suitable for use with shaft misalignments up to 90°.
Figure 3:
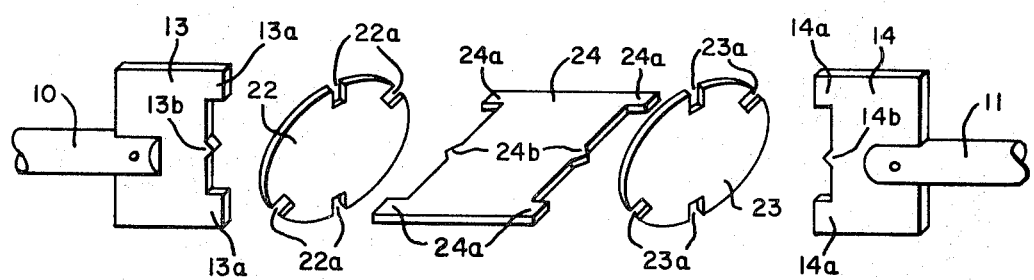
FIG. 3 is an exploded view of the coupling of FIG. 2 showing the parts in their relationship when used with aligned shafts.

FIG. 2 is a perspective view of a shaft coupling for use with shaft misalignments up to 90° or greater. This coupling includes a pair of disc-like members 22 and 23, each similar to the disc 12 of FIG. 1, and includes further a vane member 24 having hinge elements in the form of lugs 24a engaging two diametrically opposed slots of each of the disc-like members 22, 23.

In the operation of the coupling of FIG. 2, the vane 24 rotates on its center line, which intersects the axes of the shafts 10 and 11. The angular velocity of the vane 24 varies through each revolution but maintains a unity ratio between the velocities of the drive shaft 10 and the driven shaft 11 throughout each revolution. As noted, the arrangement of FIG. 2 effectively doubles the permissible misalignment between the drive shaft and the driven shaft.

In the operation of the couplings of FIGS. 1 and 2, it is desirable that the edges of the disc member slots 12a be arcuate, subtending an angle of 90°, so that they rock along one surface of the actuating arm lugs as shown in FIG. 4, avoiding sliding contact and minimizing frictional losses. This condition is obtained up to a maximum 45° angularity, as shown in FIG. 4, if the coefficient of friction between the elements is unity and, of course, will hold for lesser angles of misalignment with a correspondingly lower coefficient of friction. The static coefficient of friction of stainless steel on stainless steel or aluminum on aluminum is approximately unity and, therefore, suitable for construction of the elements of the coupling. If desired, the lugs and/or the slots may be given high-friction coatings such as polyurethane or vinyl plastic.

The couplings of FIGS. 1 and 2 are reversible. However, for small angles of misalignment between the shafts, there is some play in the coupling upon reversal, due to the fact that the width of the slots in the disc-like members is necessarily greater than the thickness of the lugs on the actuating arms to accommodate the angular movement of the disc-like members, as shown in FIG. 4. This play is usually restricted to 1° to 2° of rotation of the driven shaft and can, of course, be decreased by decreasing the thickness of the lugs. Reducing the thickness of the elements of the coupling of course reduces the amount of torque which the coupling will handle and also increases the flexibility of the coupling, permitting momentary variations in the angular velocity of the driven shaft with variations in load. The thickness of the coupling elements, therefore, represents a balancing of these characteristics in accordance with the particular operating requirements.

The couplings of FIGS. 1 and 2 have been described on the assumption that the elements are relatively rigid for all loads for which they are designed. A number of advantages can be realized by constructing at least portions of the disc members of material having resilience sufficient to enable the disc members to flex during normal operation. For example, if at least the portions of the material of the disc members on either side of the slots are of sufficient resilience to flex during normal operation as the disc member moves through its angle of gyration, the width of the slot may be narrowed to the thickness of the lug, allowing for mechanical clearance, thus substantially eliminating play upon reversal of the drive shaft. As the disc member gyrates during rotation, the material at the edges of the slots deflects in opposite directions, effectively pinching the lugs with a balanced force increasing with the angle of the lug in the slot.

Figure 5:
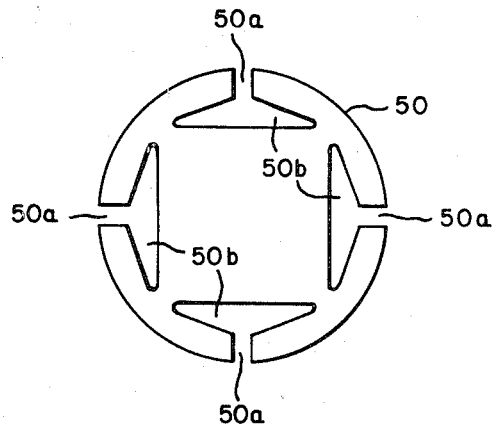
FIG. 5 is a plan view of a modified form of disc-like member for use in the couplings of FIGS. 1 to 3, inclusive.

FIG. 5 is a view of a disc member 50 constructed of resilient material and having lug-engaging slots 50a. A series of concentric slots 50b extend in both directions from the root of each of the slots.

Figure 6A:
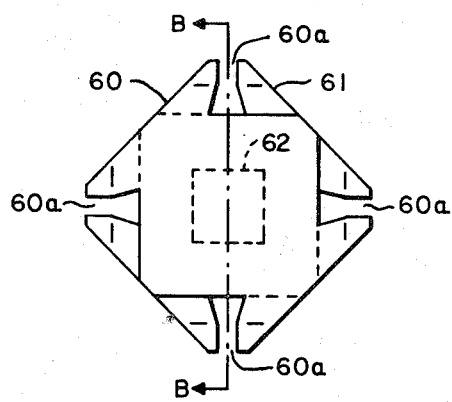
Figure 6B:
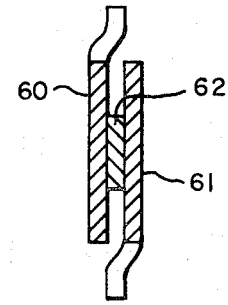

FIGS. 6A and 6B illustrate an alternative form of flexible disc member comprising two spaced resilient plates 60 and 61 secured together by attachment to a square spacing washer 62. Each of the plates 60, 61 is in the form of an essentially square plate with corners cut so that, when assembled with the washer 62, a radial slot is formed at each corner of the assembly, centered on a diagonal of the square, the two plates being angularly displaced by 90° with respect to each other. The sectors are deformed axially to locate their peripheries substantially in a common plane, forming hinge slots 60a between the opposed radial edges of the sectors. In the arrangements of both FIG. 5 and FIGS. 6A, 6B, the width of the slots can be made approximately equal to the thickness of the lugs.

Figure 7:
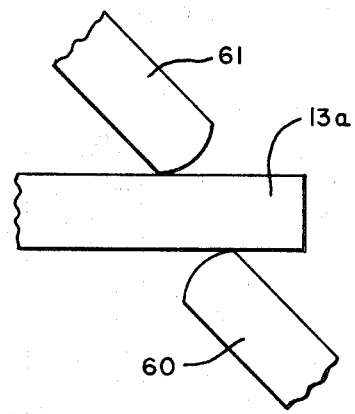
FIG. 7 is a fragmentary detail view of the manner of engagement of the hinge elements utilizing the disc-like members of FIGS. 5 and 6A, 6B.

FIG. 7 shows an enlarged detail of the engagement of the disc member 50 (FIG. 5) or the disc member 60, 61 (FIGS. 6A, 6B) and a lug 13a at an angle of 45°. It can be shown by conventional vector-force diagrams that, in order to ensure rocking action between the disc member 60, 61 and the lug 13a and the avoidance of sliding action therebetween at the extreme angularity of 45° shown, the coefficient of friction need be only 0.5 or less, which is easily realized with a variety of materials. The sides of the square spacing washer form the bases for the cantilever spring flexure of the sectors of plates 60, 61.

From the foregoing description, it is evident that the rocking-hinge coupling embodying the present invention has a number of advantages with respect to conventional universal joints and geared couplings for interconnecting shafts in misalignment as follows:

Use of rolling friction hinges in place of usual journal bearings or gear teeth for transmission of power, resulting in greater efficiency over a relatively wide range of shaft misalignments.

The arrangement of FIG. 2 further provides a constant angular velocity ratio between the driving and driven shafts.

Use of stamped sheet-metal parts of great simplicity and low-cost manufacture.

Simpler installation and lower maintenance.

Elimination of the requirement for lubrication and for lubricatiton-retaining seals.

Low mass and moment of inertia.

Physically small unit permits close spacing of shaft ends.

Accommodation of shaft misalignment of from 0° to 90° or greater.

Flexible construction, absorbing high shock loads without damage, similar to a flexible joint.

Elimination of thrust force between the shafts resulting from the use of geared couplings.

Essentially self-alignment of the parts for shafts not exactly at a predetermined angularity.

While there have been described what are, at present considered to be the preferred embodiments of the invention, it will be obvious to those skilled in the art

What is claimed is:

1. A rocking-hinge coupling for two misaligned shafts comprising:
    at least one free-floating disc-like member having two angularly spaced pairs of diametrically opposed hinge elements,
    and a pair of thin axially extending actuating vanes for individual attachment to the shafts to be coupled, each of said vanes having a pair of hinge elements engaging two diametrically opposed hinge elements of one of said pairs of hinge elements of one of said members.

2. A rocking-hinge coupling for two misaligned shafts in accordance with claim 1 in which said disc-like member has four equally spaced diametrically opposed hinge elements.

3. A rocking-hinge coupling for two misaligned shafts in accordance with claim 1 in which the hinge elements of each of said members are radially inwardly extending slots and the hinge elements of said actuating vanes are axially extending lugs.

4. A rocking-hinge coupling for two misaligned shafts in accordance with claim 3 in which said disc-like member is a simple disc.

5. A rocking-hinge coupling for two misaligned shafts in accordance with claim 3 in which the width of each of said member slots is of the order of twice the thickness of said lugs.

6. A rocking-hinge coupling for two misaligned shafts in accordance with claim 3 in which at least the portions of each of said members on either side of said slots are resilient and the width of said slots is approximately equal to the thickness of said lugs.

7. A rocking-hinge coupling for two misaligned shafts in accordance with claim 6 in which each of said members includes concentric slots extending in both directions from the roots of each of said slots.

8. A rocking-hinge coupling for two misaligned shafts in accordance with claim 6 in which said disc-like member comprises two spaced resilient plates angularly displaced by 90°, each comprising an essentially square plate with corners cut to form, when assembled, a radial slot at each corner of the assembly and said plates being reformed to locate their peripheries substantially in a common plane and forming hinge slots between opposed radial edges of said plates.

9. A rocking-hinge coupling for two misaligned shafts in accordance with claim 1 which comprises two free-floating disc-like members, each having four equally spaced diametrically opposed hinge elements and which includes a vane member having hinge elements engaging two diametrically opposed hinge elements of each of said members.

10. A rocking-hinge coupling for two misaligned shafts in accordance with claim 1 in which said disc-like members and said actuating vanes are sheet-metal stampings.

11. A rocking-hinge coupling for two misaligned shafts in accordance with claim 1 in which each of said disc-like members is a simple disc of uniform thickness.

References Cited
UNITED STATES PATENTS

| | | | |
|---|---|---|---|
| 2,080,296 | 5/1937 | Wood | 64—17 |
| 3,385,081 | 5/1968 | Wier | 64—21 |

JAMES A. WONG, Primary Examiner

U.S. Cl. X.R.

64—21